Jan. 12, 1954    J. R. JARVIS    2,666,169
PLURAL ELECTRIC MOTOR FOLLOW-UP SYSTEM
Filed Dec. 20, 1948    3 Sheets-Sheet 1
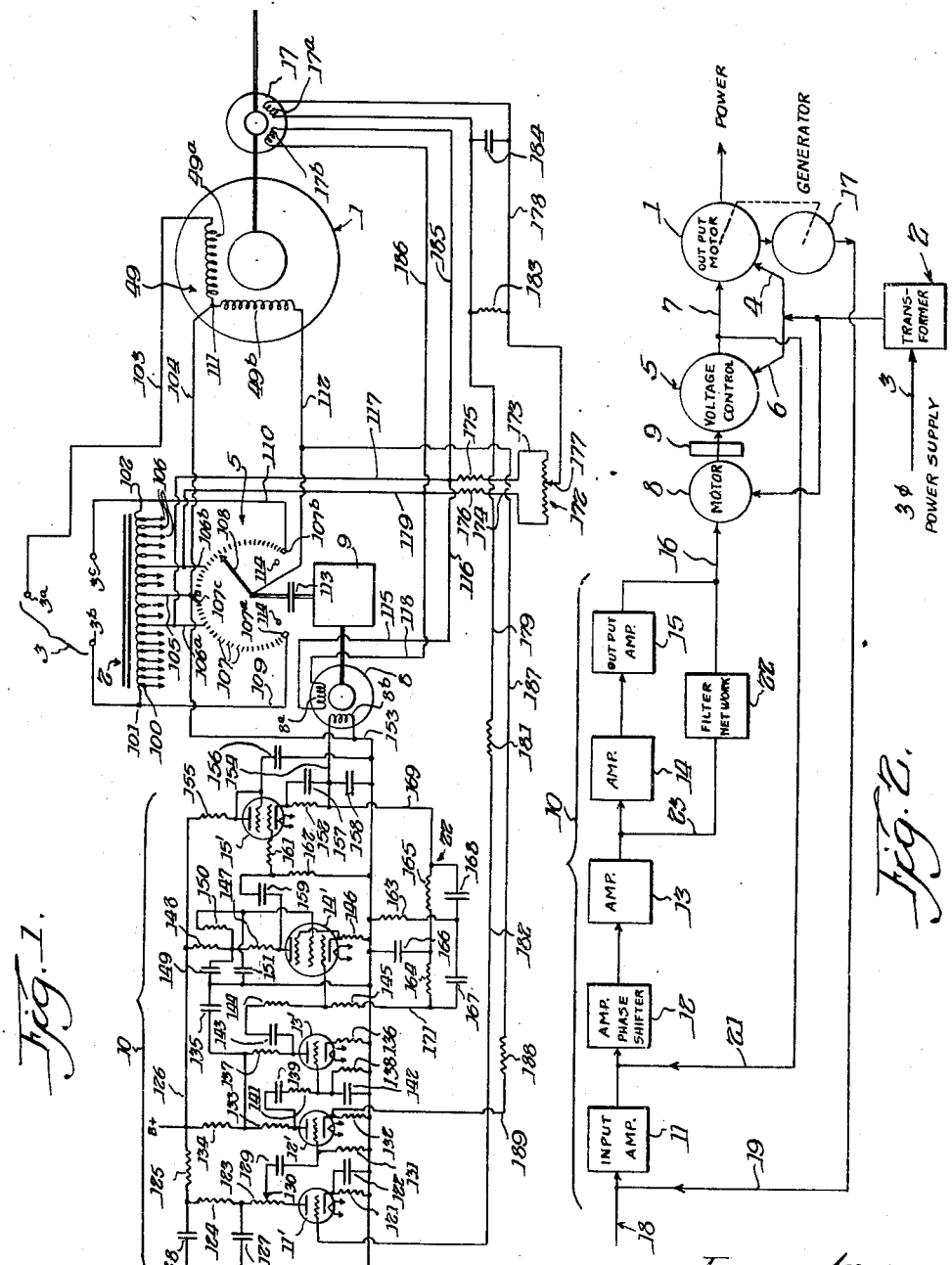
Inventor.
John R. Jarvis.
By
Tice & Tice Attys.

Jan. 12, 1954  J. R. JARVIS  2,666,169
PLURAL ELECTRIC MOTOR FOLLOW-UP SYSTEM
Filed Dec. 20, 1948  3 Sheets-Sheet 2
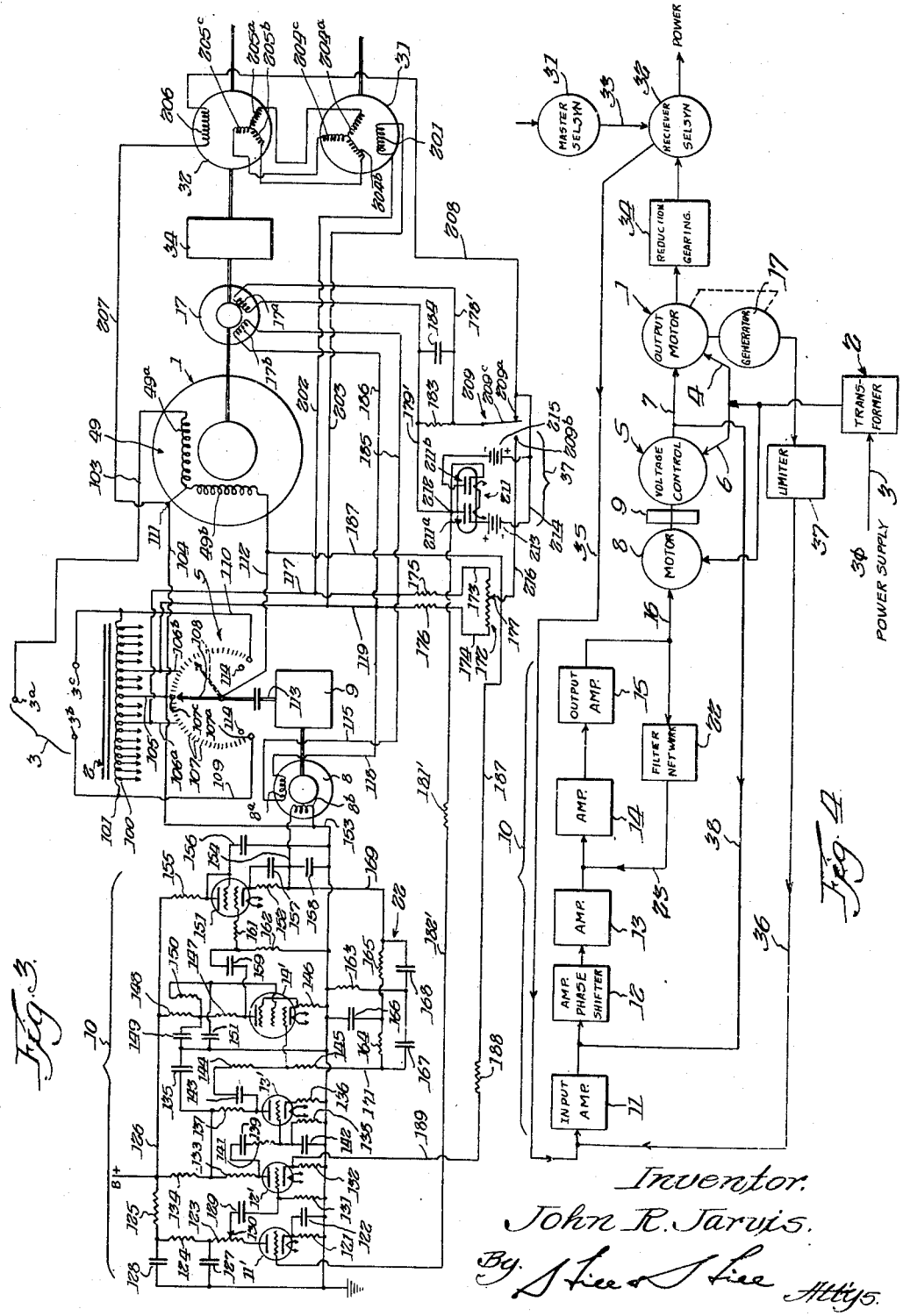
Inventor.
John R. Jarvis.
By Lee & Lee Attys.

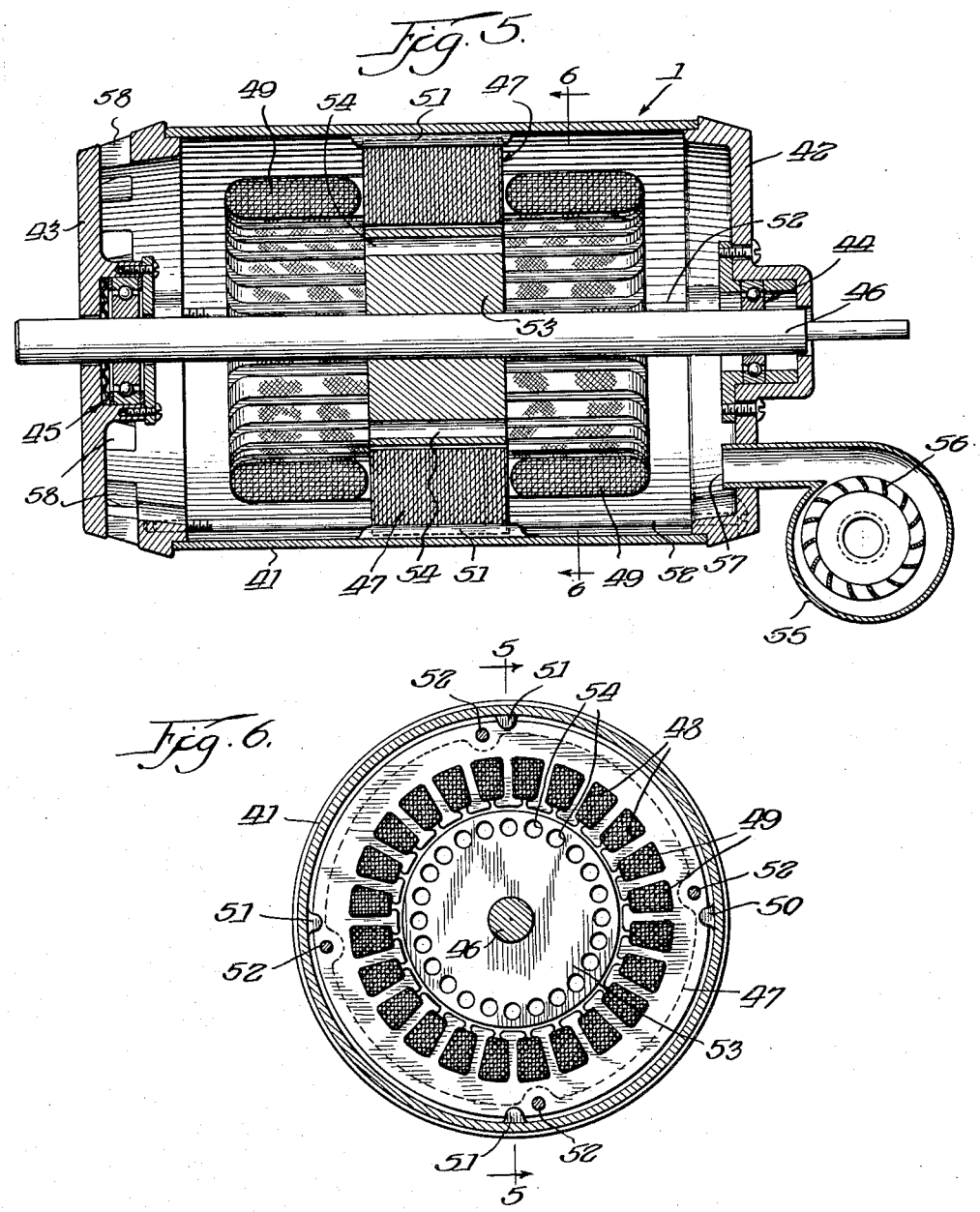

Patented Jan. 12, 1954

2,666,169

UNITED STATES PATENT OFFICE 2,666,169

PLURAL ELECTRIC MOTOR FOLLOW-UP SYSTEM

John R. Jarvis, Springfield, Ill.

Application December 20, 1948, Serial No. 66,340

16 Claims. (Cl. 318—19)

The invention relates generally to automatic power controls and, more particularly, to a servo system adapted to control the speed of a relatively large power source or the position of a relatively large power member.

The present invention is directed to a control device or system which may be employed to control the speed of rotatable elements carrying heavy loads, in response to changes in operational variables, which is hereafter referred to as a speed control, or to control the movement of large heavy elements in accordance with the movement of a small master control element, which is hereinafter referred to as a position control.

The invention has among its objects the production of such a control device in which alternating current may be employed as the prime source of energy, and only one high power level motor is required, which device is relatively small in size, rugged, durable, and very efficient in operation.

Another object of the invention is the production of a control system having a control response that is extremely fast whereby the overall response of the device is limited only by the inherent lag in the large motor forming the mechanical power source.

Another object of the invention is the production of a single device which may be employed either as a speed control or a position control.

A further object of the invention is the production of such a system which may employ a simple 2 phase squirrel cage induction motor as the mechanical energy source as contrasted with the use of direct current motors heretofore employed in servo mechanisms requiring more than ¼ horsepower output, the present invention, however, retaining all of the advantages of the direct current type of servo mechanism.

A further object of the invention is the production of a novel 2 phase induction motor particularly adapted for use in the servo systems herein described, the speed of which may be continuously varied from zero to maximum in both directions of rotation, and in which full torque is available at all speeds.

Many other objects and advantages of the invention will be apparent to those skilled in the art from the disclosure herein given.

In the drawings wherein like reference characters indicate like or corresponding parts:

Fig. 1 is a schematic diagram of a speed servo mechanism employing the present invention, Fig. 2 is a diagrammatic figure in block form of the servo mechanism illustrated in Fig. 1, Fig. 3 is a schematic diagram similar to Fig. 1, of a position servo mechanism, the latter also having provision for employing the same as a speed servo mechanism, Fig. 4 is a diagrammatic figure in block form, similar to Fig. 2, of the position servo mechanism, Fig. 5 is a sectional view of the output motor employed in the present invention taken approximately on the line 5—5 of Fig. 6, and Fig. 6 is a transverse sectional view of such motor taken approximately on the line 6—6 of Fig. 5.

Both of the control devices illustrated herein are designed for relatively large power output as contrasted with servo mechanisms designed for small loads; consequently, the controlling function is derived from a low level power source and the power for operating the large mechanical power source is locally obtained and may be independent from the low level controlling power source. Thus, in the speed control system, the controlling function may exist in the form of a voltage derived from a generator actuated by the large power motor, which may obtain its energy from a power line, and the speed of the output motor may be maintained at a substantially constant predetermined figure substantially independent of the load imposed upon the motor. Likewise, in the position control, the controlling function may exist in the form of a voltage produced by a low level power source which, in turn, controls the voltage applied to the large motor, obtained from a local source and not from the low level control voltage.

Both forms of the control device herein shown and described, while employing to a large extent the same general elements, are considerably different in operation and are, therefore, separately described. For the purpose of clarity, both the speed control and the position control will be first individually described in general, following which the basic elements common to both; namely, the large output induction motor, the power supply therefor, and the control voltage amplifier will be individually described in that order. The speed control circuits will then be described in detail, together with the operation of the speed control system, followed by the position control circuits in detail and the operation of the position control system.

*The speed control system in general*

In the past there have been numerous forms of servo mechanisms wherein the output energy is derived from the input signal or control. Such mechanisms are suitable for relatively low power output but, obviously, are not suited for use where large power output is required, in which case it is desirable that the output energy be derived from a local power source. In the present instance, the output mechanical power source is derived from a large 2 phase induction motor, one phase winding of which is continuously operated with maximum voltage, while the amplitude of the voltage applied to the quadrature phase winding is varied in accordance with the desired speed, and direction of rotation of the motor and the load thereupon. The voltage applied to the variable voltage winding is derived from a power line through a variable element by means of which the voltage amplitude may be varied. Such variable element, in turn, is mechanically moved by a suitable servo mechanism controlled primarily by 2 variables, the first being a manual control element for initially determining the normal output motor speed, and the second being the speed of the output motor. The elements for performing these various functions are diagrammatically illustrated in block form in Fig. 2 of the drawings wherein 1 designates generally the large induction motor, the shaft of which is adapted to be connected to the device to be actuated. The motor 1, which is of 2 phase construction, derives its input power from the transformer 2 operatively connected to a 3 phase power supply as indicated at 3, one phase winding having maximum voltage directly applied thereto, as indicated by the line 4. The other phase winding of the motor 1 derives its operating voltage from the transformer 2 through a variable voltage control device indicated generally by the numeral 5, the latter, in the present instance, taking the form of a commutator device receiving its input voltage from the transformer 2, as indicated by the line 6, the variable output voltage of the device 5 being transmitted to the other phase winding of the motor 1, as indicated by the line 7.

The voltage control device 5 is actuated by a relatively small servomotor 8, similar in general construction to the output motor 1 and likewise has a variable voltage applied to one phase winding thereof, the motor 8 being connected to the device 5 through suitable reduction gearing 9. The variable voltage applied to the one phase winding of the motor 8 comprises the output voltage of an electronic amplifying unit, indicated generally by the numeral 10, consisting in the present instance of 5 stages: 11 being the input stage; 12, 13, and 14 intermediate stages; and 15 the output stage, each stage employing an electronic vacuum tube and associated components. The output of the amplifier 10 is operatively connected to the servomotor 8, as indicated by the line 16.

Operatively related to the large motor 1 is a small generator 17, the armature of which is rotated by the motor 1, whereby the voltage output of the generator is proportional to the speed of the motor.

In the construction illustrated, the operating voltage to the amplifier 10 is derived from 3 sources: First, the initial control voltage entering the input stage 11, as indicated by the line 18, which determines the desired motor speed; second, the output of the generator 17 connected to the output induction motor 1, also entering the input stage 11, as indicated by the line 19, which voltage is proportional to the speed of the motor 1; and third, a portion of the voltage applied to the motor 1 from the voltage control device 5 entering the second stage 12 of the amplifier, as indicated by the line 21, which constitutes, in effect, a feed-back voltage.

The input stage 11 of the amplifier merely amplifies the electrical difference of the first two voltages. The second stage 12, in addition to amplifying the input signals, is constructed to perform the additional function of providing a 90° electrical phase shift at 60 cycles. The output of the stage 12 is fed into a third stage of amplification 13, and from the latter into a fourth stage of amplification 14, from which it is fed into the output stage 15.

A portion of the output voltage from the amplifier 10 is fed into a filter network 22 and from the latter, as indicated by line 23, to the input of the fourth stage of amplification 14, thus forming a negative feed-back circuit with the network 22 being so designed that 60 cycle voltages are highly attenuated but all other frequency components will pass therethrough, whereby all frequency components other than 60 cycle are substantially eliminated from the voltage being fed into the servomotor 8.

In the operation of the device, the initial speed of the rotor and output shaft of the motor 1 is determined by the control voltage through the line 18 to the input stage 11 of the amplifier 10, which will result in the actuation of the servomotor 8 and voltage control device 5. As the rotor and output shaft of the motor 1 rotates, thus actuating the generator 17, the output voltage of the latter is fed into the input stage 11. The latter voltage is 180° out of phase with the control voltage, so that the instantaneous polarity of such voltage is opposite to that of the initial control voltage and, for the purpose of this description, these voltages will be primarily referred to in terms of instantaneous polarity. The feed-back voltage through line 21 from the device 5 is so applied to the amplifier 10 that, in effect, it is of the same polarity as the voltage from the generator 17, whereby the output voltage of the generator 17 and feed-back voltage from the control device 5 will tend to cancel the initial control voltage and, assuming the operational characteristics, such as load, etc., on the motor 1 are substantially constant, the input voltages will be in equilibrium whereby no voltage is applied from the amplifier 10 to the servomotor 8, the latter will hold the voltage control device 5 in the proper position to maintain the motor 1 at the desired speed.

If it is desired to change the speed of the motor 1, the control voltage is varied in the desired direction, resulting in an unbalance of the input voltages, thereby actuating the servomotor 8 and voltage control device 5 to increase or decrease the voltage applied therefrom to the motor 1 and correspondingly increase or decrease the output speed of the latter. Similarly, if the load on the motor 1 changes, the speed of the latter will correspondingly change, thus increasing or decreasing, as the case may be, the output of the generator 17, again resulting in unbalance of the input voltages, whereby the mechanism will accordingly alter the voltage to the motor 1 to counteract any change in the speed thereof.

As the servomotor 8 is of the positioning type, it is desirable to introduce electrical damping in the amplifier 10 to reduce oscillation or hunting of the motor 8 and variable control device 5 to a minimum, and this function is performed by the feed-back voltage from the control device 5, such voltage, in effect, being of the same polarity as the output voltage of the generator 17 and, as the increase or decrease in amplitude of the feed-back voltage will, in effect, oppose the actuating increment of the controlling input voltages, it will be apparent that the application of such feed-back voltage to the amplifier 10 will result in a highly damped operation of the servomotor 8.

*The position control system in general*

The primary function of the position control system hereinafter described is to repeat a mechanical motion from a low power signal source to a large piece of machinery or equipment wherein considerable energy must be expended in accomplishing this motion or operation, and it is, therefore, desirable or necessary that such energy be obtained from a local power source and not from the low power signal source. The rotor of the large motor to be so controlled for accomplishing these results will, therefore, normally remain stationary other than when a change in position is desired in the machinery or equipment operated thereby.

The position control system, illustrated in block form in Fig. 4 of the drawings, embodies substantially all of the elements heretofore generally described in connection with the speed control system and, as illustrated in Fig. 4, may employ the same induction motor 1, transformer 2, having a power supply 3, one phase winding of the motor 1 being connected to the transformer 2 with the voltage for the other phase winding being derived from the voltage control device 5, the latter, in turn, being actuated by a relatively small servomotor 8 through suitable reduction gearing 9. The 5 stage amplifier 10, including filter network 22, is also employed for controlling the servomotor 8, and the generator 17 is operatively connected to the large motor 1.

The low power input signal by means of which the position of the large induction motor 1 is to be controlled is derived from a pair of Selsyn machines 31 and 32. The rotor shaft of the master or transmitter Selsyn 31 forms the master control element, the position of which is to be subsequently followed by an element of the machinery or equipment with which it is to be employed. The output of the Selsyn 31 is operatively connected as indicated by the line 33 to the receiver or follower Selsyn 32, the rotor of which is operatively connected to the output shaft of the motor 1 through suitable reduction gearing 34. In the use of Selsyn machines in connection with the present invention, instead of the rotor of the receiver Selsyn 32 following angular displacements of the rotor of the master Selsyn 31, any angular displacement between the rotors of the Selsyns 31 and 32 will be reflected as a voltage in the output of the receiver Selsyn 32, such voltage being proportional to the size of the angular difference existing between the two rotors. Thus, assuming the two rotors are in alignment, no voltage will be produced in the output circuit of the receiver Selsyn. As indicated by the line 35, the output of the receiver Selsyn 32 is operatively connected to the input stage 11 of the amplifier 10 whereby the presence of an output voltage in the receiver Selsyn 32 will be amplified and fed into the small motor 8 in such manner to vary the voltage control device 5 whereby the large motor 1 will be actuated to bring the rotor of the Selsyn receiver 32 into alignment with that of the transmitter.

Electrical damping of the motor 1 is obtained by means of the small generator 17, the armature of which is rotated by the drive shaft of the motor 1 in the same manner as that described with respect to the speed control system, the output of the generator being connected to the input stage 12 of the amplifier, as indicated by the line 36, with the voltage therefrom being subtracted from the signal voltage produced in the Selsyn 32, and it will be apparent that as the voltage from the generator 17 is proportional to the speed of movement of the shaft of the motor 1, electrical damping has been introduced and the system will be very highly damped. As such high damping action is normally desired only as the shaft of the motor 1 is approaching a new angular position and not as the shaft is trying to accomplish a big angular change, the voltage from the generator is passed through a clipper or limiter circuit 37 prior to its entering the first stage 11 of the amplifier.

It is also desirable to introduce damping in the small motor 8 to reduce oscillation and hunting in the voltage control device 5 to a minimum and, as the voltage applied to the motor 1 from the voltage control device 5 will, in the case of the position servo, normally be zero except when angular changes are to be produced by the motor 1, such damping may be readily obtained by an appropriate feedback circuit. Thus a portion of the output voltage of the voltage control device 5 may be applied, as indicated by the line 38, to the stage 12 of the amplifier 10, which voltage, as applied to the amplifier, will be in opposition to the control voltage from the receiver 32 and proportional to the actuating position of the control device 5 relative to its static position.

In the operation of the position control system, assuming the rotor of the Selsyn receiver 32 is aligned with the rotor of the transmitter 31, no control voltage will be applied to the input stage 11 of the amplifier 10, no voltage will be applied to the motor 1 from the voltage control device 5, and the entire system will be in equilibrium.

As the rotor of the transmitter 31 is then rotated to a new position, a control signal will be produced in the output circuit of the Selsyn receiver 32 and applied to the amplifier 10, from which it will be applied to the motor 8 which, in turn, will actuate the voltage control device 5 to apply a suitable voltage to the motor 1, actuating the same and rotating the rotor of the Selsyn receiver 32 towards a new position conforming to the position of the rotor of the Selsyn 31. Rotation of the shaft of the motor 1, also actuaing the generator 17, will result in the application of voltage therefrom to the input of the first stage 11 of the amplifier; such voltage, together with the feedback voltage will ultimately exceed the control voltage from the Selsyn 32 to reverse the motor 8. However, as the generator voltage is limited by the clipper or limiter 37 as the motor is attempting to accomplish a big angular change, the return action of the voltage control device will be retarded and the action of the large motor 1 accelerated until the rotor of the Selsyn receiver begins to approach its new position in conformity with the rotor of the transmitter, at which time the clipper or limiter 37 has no effect on the voltage from the generator 17, thus resulting in damping action on the motor 1 as it approaches its new final position. Likewise, as the motor 1 approaches such final position, the feedback voltage from the control device 5 is decreasing and thus, in effect, electrically damps the motor 8, reducing oscillation and hunting in the voltage control device 5.

The large induction motor

The large induction motor 1 and the small induction motor 8 are both of substantially the same general design, other than as to size, and both are of simple 2 phase design employing a squirrel cage rotor. Referring to Figs. 5 and 6 of the drawings, the motor 1 comprises an outer tubular housing 41 having end plates 42 and 43 which respectively support bearings 44 and 45, in which is mounted the drive shaft 46. Also mounted in the housing 1 is a stator core 47 composed of a plurality of suitable laminations and provided with slots 48 similar to those found in the usual induction motor. The primary windings 49 are positioned in the stator slots 48, the windings of both phases being wound in the conventional manner with the number of poles per phase and the pole pitch being governed by standard design procedures. In the present instance, the stator core 47 is supported by four beads or projections 51 carried by the housing 41, and the housing end plates 42 and 43 are maintained in assembled relation by bolts 52 passing through the end plate 42, core 47, and threaded into the plate 43.

Mounted on the shaft 46, in axial alignment with the stator 47, is a rotor 53. While the general construction of the motor 1, including the stator and primary windings, are of substantially conventional design, the rotor 53 is so designed that it possesses a very high resistance. This is accomplished by utilizing a solid rotor whereby the resistance thereof is increased to a point where maximum torque occurs at standstill and a continuous speed torque characteristic is obtained. It will be apparent that in speed control systems such as those described, the motor must have a continuous speed torque characteristic with no point of "load dropping" as the torque is increased until the rotor reaches standstill, and as the ordinary high efficiency induction motor has a discontinuous speed torque charateristic, it is unsuitable for the present purposes.

In the construction herein illustrated, the 2 phase induction motor is operated with a fixed maximum voltage upon one phase winding, while the amplitude of the voltage applied to the quadrature phase winding is varied in accordance with desired speed, direction of rotation and load, and if under a given set of running conditions the load were suddenly increased, it would slow the motor down in accordance with a continuous speed torque characteristic. It is possible to restore the original speed by increasing the variable phase winding voltage, assuming the speed desired was not too close to synchronous speed. Likewise, the speed of the motor may be varied continuously from maximum speed in one direction through zero speed to maximum speed in the opposite direction by varying the amplitude of the variable phase winding voltage from maximum amplitude of one polarity through zero to maximum amplitude of opposite polarity.

The small induction motor 8 is constructed substantially identical to the motor 1 with the exception of size and, similarly, has a continuous speed torque characteristic.

Due to the solid construction of the rotor 53, resulting in the desired high resistance thereof, it will be apparent that the induced currents will result in the generation of large amounts of heat, particularly at low rotor speeds. Consequently, it is desirable to employ a forced air cooling system to dissipate such heat and prevent the temperature of the various parts of the motor from exceeding safe limits. This is accomplished in the present construction by providing a plurality of longitudinally extending holes 54 in the rotor 53 for the passage of air therethrough and creating a forced circulation by means of the blower 55 which, in the present instance, is illustrated as being of a centrifugal type having a rotor 56 operative to force air through the blower outlet 57 into the housing 1, where it will pass through the openings 54 in the rotor and through the air gap between the latter and the stator, and out of the housing through vent openings 58 in the end plate 43. The blower 55 may be operated by any suitable means as, for example, a small electric motor (not shown) operatively connected to the rotor 56 of the blower. The openings 54 are preferably positioned as close to the periphery of the rotor as possible without creating undesirable electrical effects.

The power supply

The power supply for the large induction motor comprises the transformer 2 and voltage control device 5 operatively connected to a three-phase power supply line 3 having lines 3a, 3b, and 3c. The transformer 2, which in the present instance is an auto transformer, has one side of the winding 100 connected to the line 3b, as indicated at 101, and the other side connected to the line 3c, as indicated at 102, so that the transformer is operatively connected across one phase of the three-phase supply. The phase winding 49a of the field windings 49 of the motor 1 is connected at one end by a conductor 103 to the line 3a of the power line, and the opposite end of the winding 49a is connected by a conductor 104 to the center tap 105 of the winding 100 of the transformer 2, whereby a fixed voltage that is ninety electrical degrees out of phase with the voltage existing across the terminals 101 and 102 of the winding 100 is applied across the winding 49a.

The winding 100 is provided with a plurality of taps 106, each section of the transformer winding between adjacent taps being of equal turns whereby the voltage differential between adjacent taps is uniform from the terminal 101 to the terminal 102.

The voltage control device 5 comprises a plurality of commutator segments 107 and a brush 108 which may contact any one of the segments 107. The terminals 101, 102, center tap 105, and intermediate taps 106 are operatively connected to corresponding segments 107 of the voltage device 5, the terminal 101 being connected by a conductor 109 to the end segment 107a, the terminal 102 being connected to the end terminal 107b by conductor 110, and the center tap 105 being connected to the center segment 107c. The remaining taps 106 are operatively connected to successive segments 107, the connection of only two of the taps 106a and 106b to corresponding segments 107 being illustrated in Fig. 1. Any suitable number of taps 106 and segments 107 may be employed, preferably the number of taps and segments being such that the voltage differential between segments is a practical minimum.

One side of the quadrature phase winding 49b of the motor 1 is connected to the conductor 104 and adjacent terminal of the winding 49a as indicated at 111, the opposite side of the winding 49b being connected to the brush 108 by a conductor 112. Thus as the brush 108 is moved over the segments 107, a variable voltage ninety electrical degrees out of phase with the voltage applied to the winding 49a is applied to the winding 49b, the voltage applied to the latter winding varying from maximum amplitude in one direction or polarity when the brush contacts the segment 107a, through zero voltage when the brush contacts the segment 107c, to maximum voltage in the opposite direction or polarity when the brush contacts the segment 107b, the amplitude of such voltage varying in uniform steps as the brush 108 contacts the various intermediate segments. It will be apparent that the speed of the motor 1 may, therefore, be continuously varied from top speed in one direction, through zero speed, to top speed in the opposite direction by varying the position of the brush 8 with respect to the commutator segments 107.

The brush 108 is operatively connected to the small induction motor 8 through suitable reduction gearing 9 which may be of standard construction, a suitable spring clutch 113 being interposed between the brush 108 and the reduction gearing 9. Stops 114 limit further brush movement when the brush reaches either of the end segments 107a or 107b, and as there may be occasions when the motor 8 will tend to rotate the brush beyond either of the two end segments, such further movement is prevented by the stops 114 and the clutch 113 will then permit slippage between the reduction gearing 9 and the brush 108 so that the motor 8 may continue to run without stalling.

The small motor 8, as previously mentioned, with the exception of size, is of similar construction and possesses similar operational characteristics as the motor 1, and is provided with two phase windings 8a and 8b, the former having one side thereof connected by conductors 115, 116, and 117 to the tap 106a of the transformer 2, and the opposite side of the winding connected by conductors 118 and 119 to the tap 106b of the transformer, whereby a fixed voltage is applied to the winding 8a of the motor 8. The particular taps 106a and 106b are equidistant from the center tap 107c, whereby the voltages between the respective taps 106a and 106b with respect to the center tap 105 are equal, the particular taps to be employed depending upon the voltage desired across the winding 8a. The quadrature winding 8b of the motor 8 derives its operating voltage from the amplifier 10 which, in turn, is governed by the speed of the motor 1 as heretofore generally described.

The voltage amplifier

The voltage amplifier 10, in the present instance, comprises five stages employing electronic vacuum tubes 11', 12', 13', 14', and 15', respectively corresponding to the stages 11, 12, 13, 14, and 15 illustrated in Fig. 2.

The general construction of the amplifier 10 follows usual design procedure, and other than as to details partinent to the present invention, will be described merely by indicating the respective components and connections.

The input tube 11', illustrated in the present instance as being a triode, is self-biased by means of the resistance 121, shunted by a bypass condenser 122, both respectively connected to the cathode of tube 11' and ground. The grid of the tube is operatively connected in the control circuits, described in subsequent sections, and the plate of the tube is connected through load resistance 123 and series resistances 124 and 125 to a direct current B-plus or plate supply line 126, with the resistances 124 and 125, and condensers 127 and 128 effectively decoupling the plate from the plate supply line. The plate of the tube 11' is coupled to the grid of the tube 12' by the condenser 129 connecting the grid to the movable tap 130 of the load resistance 123, and resistance 131 comprises the grid resistance for the tube 12'.

The latter, also illustrated as being a triode, is self-biased by means of the resistance 132 connected between ground and the cathode of the tube, and connected to the plate of the tube is the load resistance 133, the latter being connected to the direct current plate voltage line 126 through a decoupling resistance 134, a bypass condenser 135 being operatively connected from the juncture of the resistance 132 and 134 to ground operative to decouple the plate circuit from the line 126.

The third stage amplifier tube 13', likewise a triode, is self-biased by a resistance 136 connected between ground and the cathode of the tube, and connected to the plate thereof is load resistance 137, which is also connected to the resistance 134 and condenser 135, whereby the plate circuits of both tubes 12' and 13' are decoupled thereby from the line 126. Resistance 138 forms the grid resistance for the tube 13', the grid of which is coupled to the plate of the tube 12' through condenser 139 and resistance 141. Condenser 142 extending between the grid of the tube 13' and ground, together with the resistance 141, comprise a phase shift network, the components of which are so selected that a 90° electrical phase shift at 60 cycles is produced, the network also being operative to attenuate any undesirable high frequency signal component.

The plate of the tube 13' is coupled to the grid of the tube 14', illustrated as being a pentode, through condenser 143 and resistance 144. The resistance 145 forms the grid resistance for the tube 14', which is self-biased by the cathode resistance 146. The load resistance 147 of the tube 14' is operatively connected to the B-plus line 133 through a resistance 148, bypass condenser 149 being connected between ground and the juncture of the resistances 147 and 148, and the screen of the tube 14' is connected through a voltage dropping resistance 150 to the juncture of the resistances 147 and 148, bypass condenser 151 being connected between ground and the screen of the tube, with the resistance 148 and condenser 149 decoupling the plate and screen of the tube from the line 126.

The output stage 15 of the amplifier, comprising tube 15', employs a cathode follower output circuit, the cathode being connected to ground through resistance 152, which is in series with the winding 8b of the motor 8, one side of the winding 8b being connected to ground, as indicated at 153, and the opposite side being connected to the resistance 152 by the conductor 154. The tube 15' which, in the present instance, is illustrated as being a tetrode is operated as a triode with the plate and screen tied together and operatively connected to the supply line 133 through a load resistance 155, bypass condenser 156 being connected between the plate and ground. The cathode resistance 152 is shunted by a condenser 157, and the winding 8b is shunted by a condenser 158, which compensates for the inductive component of current drawn by the winding. The grid of the tube 15' is coupled to the plate of the tube 14' by condenser 159 and resistance 161, with the resistance 162 forming the grid resistance.

Voltage from the cathode output circuit of the tube 15' is introduced into the grid circuit of the tube 14' through the parallel T filter network 22 comprising resistances 163, 164, and 165, and condensers 166, 167, and 168, the input side of the network being connected to the juncture of the cathode resistance 152 of the tube 15' and the conductor 154 by conductor 169, the output side of the filter being connected to the grid resistor 145 of the tube 14' by conductor 171. The resistances and condensers making up the network 22 are so selected that a frequency of 60 cycles is very highly attenuated, while a high degenerative feed-back is introduced into the tube 14' for frequencies other than 60 cycle. Consequently, the amplifier stage 14 will highly attenuate frequencies other than 60 cycle. As the output of the amplifier 10 is operatively connected to the winding 8b of the motor 8, it will be apparent that if the input voltage to the amplifier is in phase with the voltage across the winding 8a of the motor 8, any voltage applied to the winding 8b, as a result of the 90° phase shift in the second stage of the amplifier, will result in the actuation of the motor and movement of the brush 108.

The speed control circuits

As mentioned in connection with the general discussion of the speed control system, the input into the amplifier 10 is derived from 3 sources: First, the initial control voltage for determining the desired speed of the motor 1; second, the speed control voltage from the generator 17 proportional to the speed of the output shaft of the motor 1; and third, the feed-back voltage from the voltage control device 5.

The first of these voltages is obtained from a potentiometer 172, the respective ends of which are operatively connected to the taps 106a and 106b of the transformer 2 by conductors 173 and 174, resistances 175 and 176 in series with the respective conductors 173 and 174 merely determining the voltage limits across the potentiometer 172.

The output winding 17a of the generator is connected in series with the initial control voltage circuit, the movable contact 177 of the potentiometer being connected by a conductor 178 to one side of the output winding 17a of the generator 17, and the opposite side of the winding 17a being connected by conductor 179 to resistance 181 which, in turn, is connected by conductor 182 to the grid of the tube 11'. Shunted across the winding 17a is a resistance 183 and a condenser 184. The excitation winding 17b is operatively connected by conductors 185 and 186 to the conductors 117 and 119 and thus to the taps 106a and 106b of the transformer 2 and, as the voltages across the winding 17b and the potentiometer 172, as well as across the winding 8a of the motor 8, are derived from the same source, it will be apparent that all of these voltages will be in phase. Similarly, the combined voltage introduced through the grid resistance 181 to the tube 11' will be the electrical subtraction of the voltage existing across the winding 17a resulting from rotation of the rotor of the motor 1, from the voltage between the center tap 105 and the movable contact 177, as there will be a 180° phase shaft between the latter and the output voltage of the generator 17, or in other words, the two instantaneous voltages will be of opposite polarity.

The feed-back voltage from the voltage control device 5 is obtained by operatively connecting the brush 108 to the cathode of the tube 12' through conductor 187, series resistance 188 and conductor 189, whereby a portion of the voltage existing between the brush and the center tap 105 is applied to the cathode of the tube. It will be apparent that, as this voltage is 180° out of phase with the initial control voltage between contact 177 and the center tap 105 and is applied to the cathode while the control voltage is applied to the grid of the tube 12', the feed-back voltage will be reflected in the output of the tube 12' as of opposite polarity to the initial control voltage. Consequently, any signal voltage in the output of the tube 12' will be the voltage difference between the initial control voltage and the electrical difference of the generator output and feedback voltages, the latter two being of the same effective polarity, and the former of opposite polarity. The amplitude of the feed-back voltage will be dependent on the resistance of the voltage dropping resistor 188.

Operation of the speed control system

In the operation of the construction illustrated in Fig. 1, assuming that the motor 1 is operating at a uniform continuous speed, load, etc., the brush 108 will be positioned on one of the intermediate segments 107 of the voltage control device 5, as illustrated in Fig. 1, whereby the voltage applied to the winding 49b of the motor 1 is sufficient to maintain the motor at the desired speed. Under such conditions, the net total input voltage in the amplifier 10 is such that the output of the first stage 11, which represents the difference between the control voltage and the generator voltage multiplied by the gain of the first stage and which will be of the opposite polarity as the initial control voltage, is balanced by the feed-back voltage from the brush 108. Consequently, the output from the amplifier 10 is zero, no voltage is applied to the winding 8b of the motor 8, and the rotor of the latter will hold the brush 108 stationary.

If a different motor speed is desired, the movable contact 177 of the potentiometer 172 is shifted in the desired direction, thereby unbalancing the input voltages and resulting in the application of a voltage, the polarity of which will be dependent upon the direction of movement of the contact 177, from the amplifier 10 to the winding 8b of the motor 8, and as the amplifier has shifted the phase 90° with respect to the input voltage, the motor 8 will be actuated to rotate in the proper direction to move the brush 108 to a new position with a corresponding increase or decrease in the voltage on the winding 49b of the motor 1 and increase or decrease the speed of the latter. The change in speed of the motor will be reflected in a proportional change in the output of the generator 17 until the three input voltages again balance, at which point the brush 108 will remain stationary.

Similarly, when the load on the motor changes, a corresponding unbalance in the input voltages will be produced and the brush 108 will be moved in a direction to compensate for the load change. Thus, assuming a load increase, the motor 1 will be slowed down in accordance with its continuous speed torque characteristic, resulting in a lower generator output voltage. An input voltage of the same polarity as the control voltage would then result which, after amplification and a phase shift of 90°, will actuate the motor 8 to rotate the brush 108 in a direction to increase the voltage on the field and restore the speed of the motor, and the brush 108 will ultimately stop at a point where the input voltages are again in balance.

In this connection it will be noted that, as the brush changes position in response to an output voltage from the amplifier, the feed-back voltage will also change, such change opposing the change called for in the input circuits. Consequently, the feed-back circuit is operative to apply electrical damping to the motor 8 and brush 108. However, the circuit design characteristics are such that, in the case of increased load, a relatively small change in the generator voltage will result in maximum voltage in the motor 1 to tend to compensate as rapidly as possible for the increased load, so that the effect of the feed-back is first an accelerating action on the motor 1 and subsequently a damping action on the motor 8 as the motor 1 approaches its original speed and the brush 108 moves in a reverse direction to a point where the input voltages are again balanced.

This action results from the possible decrease of the generator voltage to a point where the maximum feed-back voltage is insufficient to bring the system into balance until the generator output has been sufficiently increased, after which a reversing voltage will be applied to the motor until the brush 108 is at a point where the increased voltage on the motor 1 substantially offsets the increased load. The action for decreased loads is substantially the same, with the polarity of the actuating voltages being reversed and the movements of the respective elements being in the opposite direction.

It might be mentioned that, as a small voltage differential exists between adjacent commutator segments 107 of the voltage control device 5, as a practical matter the brush 108 will normally attempt to take on a new position to supply the proper amount of power to the large induction motor even with a constant load torque upon the motor shaft. Obviously, if the number of commutator segments employed is increased, the voltage differential between adjacent segments will be reduced with a corresponding reduction in the tendency of the brush to oscillate or hunt, resulting in smoother operation of the motor.

Likewise, while the feed-back voltage will vary slightly for different settings of the brush 108, as only a small fraction of the brush voltage is employed and is offset against the voltage differential between the initial control voltage and the generator voltage, only after such differential has been first amplified by the first stage 11 of the amplifier, any differential between original and compensated speeds resulting therefrom will be inconsequential, particularly in view of the hunting action referred to above, and regardless of both of these conditions, the average speed of the motor will remain substantially constant at a speed determined by the setting of the potentiometer 172. Obviously, such differential will be dependent upon the amount of feed-back, which, in turn, is primarily determined by the resulting damping action to be produced. While the action of the system would appear somewhat involved, the response thereof is considerably faster than the ability of the large electric motor employed therewith to respond to voltage changes, and the response of the motor is, therefore, the only limiting factor in the overall action of the device.

*The position control circuits*

As mentioned in connection with the general discussion of the position control system, the latter generally is quite similar to the speed control system, and the amplifier 10, motor 8, voltage control device 5, transformer 2, motor 1, and the brush feed-back circuit are all connected, as have been previously described in connection with the circuit illustrated in Fig. 1. In addition to these elements, the two Selsyn machines 31 and 32, and limiter or clipper circuit 37 are added, and the input circuits to the first stage 11 of the amplifier 10 are accordingly modified.

Referring to Fig. 3, the primary winding 201 of the transmitter or master Selsyn 31 is connected by conductors 202 and 203 to the conductors 117 and 119, and by the latter conductors to the taps 106a and 106b of the transformer 2. The secondary windings 204a, 204b, and 204c are connected in parallel with the corresponding secondary windings 205a, 205b, and 205c of the receiver Selsyn 32. The primary 206 of the receiver Selsyn 32 is connected at one end by a conductor 207 to the conductor 104 and thus to the center tap 105 of the transformer. The opposite end of the winding 206 is operatively connected by conductor 208, switch 209, and conductor 178′ to one side of the output winding 17a of the generator 17, the opposite side of the winding 17a being connected by a conductor 179′ to a resistance 181′ which, in turn, is connected by conductor 182′ to the grid of the tube 11′ of the amplifier 10. Thus the primary winding 206 of the Selsyn 32 and the winding 17a of the generator 17 are in series. These windings are so connected that the output voltage of the generator 17 is electrically subtracted from the voltage across the primary winding 206, whereby the voltage from the generator 17 will provide electrical damping of the motor 1.

As a high damping action is desired only as the shaft of the motor 1 is approaching a new angular position but not as the shaft is trying to accomplish a big angular change, the voltage from the generator 17 is passed through a clipper or limiter circuit 37. This action is accomplished in the construction illustrated in Fig. 3 by the tube 211, comprising two diodes 211a and 211b, the diode 211a having its plate and the diode 211b having its cathode connected to the line 179′ as indicated at 212. The cathode of the diode 211a is biased by a battery 213 having its positive side connected to the cathode and its negative side connected by conductor 214 and switch 209 to the conductor 178′; while the plate of the diode 211b is connected to the negative side of a battery 215 which has its positive side connected to the conductor 214. Thus when the switch 209 is in the position illustrated in Fig. 3, conductors 178′ and 208 are connected and the two diodes and their respective batteries are shunted across the winding 17a of the generator 17. This limiter circuit is of standard design, and its operation is believed self-evident whereby both amplitude peaks of the voltage generator 17 are clipped or limited to a pre-determined voltage governed by the voltage across the respective batteries 213 and 215.

Operation of the position control system

Assuming the rotors of the two Selsyns 31 and 32, and therefore the respective secondary windings 204 and 205 thereof are in alignment, as illustrated in Fig. 3, no voltage will be produced across the primary winding 206 of the receiver Selsyn 32, and as the rotor of the motor 1 is stationary, no voltage will be produced across the winding 17a of the generator 17. Consequently, no input voltage is applied to the amplifier 10, and the motor 8 and brush 108 remain stationary, the brush being positioned on the segment 107c connected to the center tap 105 of the transformer whereby no voltage exists across the winding 49b of the motor 1.

If the shaft of the transmitter Selsyn 31 is then partially rotated, rotating the secondary windings and creating an angular displacement between the latter and the secondary windings 205 of the receiver Selsyn, a voltage will be produced across the primary winding 206 resulting in the application of a voltage to the grid of the tube 11' which, in turn, will create a voltage across the winding 8b of the motor 8 to actuate the same and move the brush 108 to a new position. This action will, in turn, result in the application of a voltage across the winding 49b of the motor 1. The direction of the motor 8 and brush 108 is such that the polarity of the voltage applied to the winding 49b will rotate the shaft of the motor 1 in a direction to bring the secondary winding of the Selsyn receiver 32 into alignment with the secondary windings of the transmitter 31, motion from the drive shaft of the motor 1 being transmitted through the reduction gearing 34.

As the brush 108 moves and motor 1 is actuated, voltages will be produced across the winding 17a of the generator 17 and in the brush feedback circuit of the amplifier opposite in polarity to the voltage developed across the primary winding 206 of the Selsyn receiver 32, and the sum of the amplified generator voltage and the feedback voltage will oppose the amplified voltage from the Selsyn 32 and thus tend to reverse the motor 8 and return the brush 108 to the center tap segment 107c. However, due to the action of the limiter or clipper circuit, such return voltage will not be reflected in the movement of the brush 108 until the rotor of the receiver Selsyn begins to approach the desired position, resulting in a slow down of the motor 1 until the sum of the voltage developed across the generator winding 17a, as limited by the circuit 37 and amplified by the first amplifier stage and feed-back voltage from the brush 108, exceeds the output voltage of the Selsyn recever 32 as amplified by the first amplifier stage, at which point the output voltage from the amplifier 10 reverses in polarity, thereby reversing the motor 8 and movement of the brush 108. As the brush continues its movement toward the center tap segment 107c, it will slow down slightly as the feed-back voltage and output voltage from the Selsyn 32 are diminishing, until the generator voltage falls below the limiting action of the clipper circuit 37, at which time all input voltages are simultaneously diminishing and each approaching zero.

Consequently, for large angular changes, the brush 108 may initially move through its full travel to place maximum voltage on the winding 49b, whereby the motor 1 will rapidly respond to move the rotor and secondary windings 205 of the Selsyn receiver 32 towards its new desired position, and as the latter approaches such new position, the rotor will rapidly slow down and substantially crawl into the exact position desired. It will be apparent that while the motor 1 therefor will have a very highly damped action when approaching the desired position, it will initially respond substantially as if little or no damping existed.

Likewise, as in the case of the speed control, the brush feedback voltage is always of such direction or polarity as to oppose the actuating voltage from the Selsyn receiver 32 so that electrical damping of the motor 8 and brush 108 is achieved. Similarly, the response of the position control system is very much faster than the response of the motor 1, so that the overall response of the system is limited only by the motor lag.

The combined speed and position control

The control systems above described may be incorporated in a single device which may be readily employed, either as a speed control or a position control, merely by the actuation of a single switch.

Referring to Fig. 3, it will be noted that the potentiometer 172 and resistors 175 and 176, although not employed in the position control, are provided and connected to the transformer 2, as illustrated and described in connection with the speed control. The switch 209 is illustrated as a single pole double throw switch having two stationary contacts 209a and 209b, and a movable contact 209c, the stationary contacts being respectively connected to conductor 208 from the output primary winding of the Selsyn 32, and the conductor 216 to the movable contact 177 of the potentiometer 172. Thus when the contacts 209a and 209c are closed, as illustrated in Fig. 3, the system is connected as described for operation as a position control, and when the contacts 209b and 209c are closed, the system is connected for operation as a speed control, the Selsyn machines 31 and 32 and the limiter circuit 37 being rendered inoperative. In such case, power from the motor 1 may be taken either from the output shaft of the reduction gearing 34 or directly from the drive shaft of the motor 1, in which case the latter may, if desired, be disconnected from the reduction gearing.

It will be noted from the above description that I have provided a speed or position control system employing alternating current, which is very fast in response, rugged in construction, and very efficient in operation, particularly adapted for use where large power output is required. Likewise, as only one high power level motor is required, the entire device is relatively inexpensive to manufacture.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a device of the kind described, the combination of a 2-phase induction motor, the rotor of said motor being of solid construction to provide maximum torque at standstill, an autotransformer adapted to be connected across one phase of a 3-phase power supply line, means for connecting one phase winding of said motor to the center tap of said transformer and the third phase of said power line, said auto-transformer having a plurality of additional taps, the voltage differential between adjacent taps being uniform, a commutator device including a plurality of commutator segments, the number of which corresponds to the number of taps on said transformer winding with the latter connected to corresponding segments and a brush adapted to contact any one of said segments, means connecting the other phase winding of said motor to the center tap of said transformer and to said brush whereby the position of the latter relative to said segments will determine the phase relation and amplitude of the voltage applied to said second winding, a second 2-phase induction motor having characteristics similar to that of the first motor, reduction gearing operatively connecting the drive shaft of said second motor to said brush for moving the latter relative to said segments, an overload clutch interposed between said reduction gearing and said brush, said second motor having one phase winding thereof operatively connected to said transformer to apply a relatively fixed voltage thereto, an electronic amplifier, the output circuit of which is operatively connected to the other phase winding of said second motor, said amplifier including means for producing a 90° phase shift in the output voltage thereof relative to the input voltage thereto and means for attenuating frequencies other than 60 cycle in the output of said amplifier, means for applying an initial control voltage to the input of said amplifier, an alternating current voltage producing means operatively connected to and actuatable by said first motor, means for operatively connecting the voltage output of said voltage producing means to the input of said amplifier 180° out of phase with respect to said initial control voltage and means operatively connecting said brush and said amplifier to feed back a portion of the brush voltage into said amplifier, in electrical time phase with respect to the output voltage of said voltage producing means.

2. In a device of the kind described, the combination of a 2-phase induction motor, the rotor of said motor being of solid construction to provide maximum torque at standstill, an auto-transformer adapted to be connected across one phase of a 3-phase power supply line, means for connecting one phase winding of said motor to the center tap of said transformer and the third phase of said power line, said auto-transformer having a plurality of additional taps, the voltage differential between adjacent taps being uniform, a commutator device including a plurality of commutator segments, the number of which corresponds to the number of taps on said transformer winding with the latter connected to corresponding segments and a brush adapted to contact any one of said segments, means connecting the other phase winding of said motor to the center tap of said transformer and to said brush whereby the position of the latter relative to said segments will determine the phase relation and amplitude of the voltage applied to said second winding, a second 2-phase induction motor having characteristics similar to that of the first motor, reduction gearing operatively connecting the drive shaft of said second motor to said brush for moving the latter relative to said segments, said second motor having one phase winding thereof operatively connected to said transformer to apply a relatively fixed voltage thereto, an electronic amplifier, the output circuit of which is operatively connected to the other phase winding of said second motor, means for producing a 90° phase shift in the output voltage of said amplifier relative to the input voltage thereto, means for applying an initial control voltage to the input of said amplifier, an alternating current voltage producing means operatively connected to and actuatable by said first motor, means for operatively connecting the voltage output of said voltage producing means to the input of said amplifier 180° out of phase with respect to said initial control voltage and means operatively connecting said brush and said amplifier to feed back a portion of the brush voltage into said amplifier, in electrical time phase with respect to the output voltage of said voltage producing means.

3. In a device of the kind described, the combination of a 2-phase induction motor, the rotor of said motor being of solid construction to provide maximum torque at standstill, an auto-transformer adapted to be connected across one phase of a 3-phase power supply line, means for connecting one phase winding of said motor to the center tap of said transformer and the third phase of said power line, said auto-transformer having a plurality of additional taps, the voltage differential between adjacent taps being uniform, a commutator device including a plurality of commutator segments, the number of which corresponds to the number of taps on said transformer winding with the latter connected to corresponding segments and a brush adapted to contact any one of said segments, means connecting the other phase winding of said motor to the center tap of said transformer and to said brush whereby the position of the latter relative to said segments will determine the phase relation and amplitude of the voltage applied to said second winding, a second 2-phase induction motor having characteristics similar to that of the first motor, reduction gearing operatively connecting the drive shaft of said second motor to said brush for moving the latter relative to said segments, said motor having one phase winding thereof operatively connected to said transformer to apply a relatively fixed voltage thereto, an electronic amplifier, the output circuit of which is operatively connected to the other phase winding of said second motor, whereby said motor will be actuated by the amplifier output voltage, means for applying an initial control voltage to the input of said amplifier, an alternating current voltage producing means operatively connected to and actuatable by said first motor, means for operatively connecting the voltage output of said voltage producing means to the input of said amplifier in pre-determined phase relation with respect to said initial control voltage and means operatively connecting said brush and said amplifier to feed back a portion of the brush voltage into said amplifier, in a pre-determined relationship phase with respect to the other input voltages of said amplifier.

4. In a position control device, the combination of a 2-phase inductor motor, the rotor of said motor being of solid construction to provide maximum torque at standstill, an auto-transformer adapted to be connected across one phase of a 3-phase power supply line, means for connecting one phase winding of said motor to the center tap of said transformer and the third phase of said power line, said auto-transformer having a plurality of additional taps, the voltage differential between adjacent taps being uniform, a commutator device including a plurality of commutator segments, the number of which corresponds to the number of taps on said transformer winding with the latter connected to corresponding segments and a brush adapted to contact any one of said segments, means connecting the other phase winding of said motor to the center tap of said transformer and to said brush whereby the position of the latter relative to said segments will determine the phase relation and amplitude of the voltage applied to said second winding, a second 2-phase induction motor having characteristics similar to that of the first motor, reduction gearing operatively connecting the drive shaft of said second motor to said brush for moving the latter relative to said segments, said second motor having one phase winding thereof operatively connected to said transformer to apply a relatively fixed voltage thereto, an electronic amplifier, the output circuit of which is operatively connected to the other phase winding of said second motor, said amplifier including means for producing a 90° phase shift in the output voltage thereof relative to the input voltage thereto and means for attenuating frequencies other than 60 cycle in the ouput of said amplifier, a master and a follower Selsyn mechanism, comprising the master position control element and the receiver Selsyn being operatively connected to and adapted to be rotated by said first motor, means for applying control voltage from the receiver Selsyn reflecting angular displacement between it and the master Selsyn to the input of said amplifier, an alternating current voltage producing means operatively connected to and actuatable by said first motor, the output voltage of which is proportional to the speed of the first motor, means for operatively connecting the output circuit of said voltage producing means to the input of said amplifier 180° out of phase with respect to said control voltage, means for limiting the maximum voltage from said last mentioned means applied to said amplifier, and means operatively connecting said brush and said amplifier to feed back a portion of the brush voltage into said amplifier, in electrical time phase with respect to the output voltage of said voltage producing means.

5. In a speed control device, the combination of a 2-phase induction motor, the rotor of said motor being of solid construction to provide maximum torque at standstill, an auto-transformer adapted to be connected across one phase of a 3-phase power supply line, means for connecting one phase winding of said motor to the center tap of said transformer and the third phase of said power-line, said auto-transformer having a plurality of additional taps, the voltage differential between adjacent taps being uniform, a commutator device including a plurality of commutator segments, the number of which corresponds to the number of taps on said transformer winding with the latter connected to corresponding segments and a brush adapted to contact any one of said segments, means connecting the other phase winding of said motor to the center tap of said transformer and to said brush whereby the position of the latter relative to said segments will determine the phase relation and amplitude of the voltage applied to said second winding, a second 2-phase induction motor having characteristics similar to that of the first motor, reduction gearing operatively connecting the drive shaft of said second motor to said brush for moving the latter relative to said segments, said second motor having one phase winding thereof operatively connected to said transformer to apply a relatively fixed voltage thereto, an electronic amplifier, the output circuit of which is operatively connected to the other phase winding of said second motor, said amplifier including means for producing a 90° phase shift in the output voltage thereof relative to the input voltage thereto and means for attenuating frequencies other than 60 cycle in the output of said amplifier, means for selectively applying an initial control voltage of desired phase and amplitude to the input of said amplifier, an alternating current voltage producing means operatively connected to and actuatable by said first motor, the ouput voltage of which is proportional to the speed of the first motor, means for operatively connecting the voltage output of said voltage producing means to the input of said amplifier 180° out of prase with respect to said initial control voltage and means operatively connecting said brush and said amplifier to feed back a portion of the brush voltage into said amplifier, in electrical time phase with respect to the output voltage of said voltage producing means.

6. In a device of the kind described, the combination of a 2-phase induction motor, the rotor of said motor being of solid construction to provide maximum torque at standstill, means for applying an alternating current of substantially fixed voltage to one phase winding of said motor, means for applying an alternating current of variable voltage 90° out of phase with respect to said first voltage to the other phase winding of said motor, a second 2-phase induction motor having characteristics similar to that of the first motor operatively connected to said last mentioned means, operative to control the output voltage thereof applied to the first motor, means for applying a relatively fixed voltage to a one phase winding of said second motor, an electronic amplifier, including a plurality of electronic vacuum tubes, each including a cathode grid and plate, the output circuit of which is operatively connected to the other phase winding of said second motor, means for applying an initial control voltage to the grid of the input tube of said amplifier, an alternating current voltage producing means operatively connected to and actuatable by said first motor, means for operatively connecting the voltage output of said voltage producing means to the grid of the input tube of said amplifier 180° out of phase with respect to said initial control voltage and means operatively connecting said variable voltage supply and the cathode of an intermediate tube of said amplifier to feed back a portion of the voltage applied thereby to said first motor into said amplifier, in electrical time phase with respect to the output voltage of said voltage producing means.

7. In a device of the kind described, the combination of a 2-phase induction motor, the rotor of said motor being of solid construction to provide maximum torque at standstill, means for applying an alternating current of substantially fixed voltage to one phase winding of said motor, switching means for applying an alternating current of variable voltage 90° out of phase with respect to said first voltage to the other phase winding of said motor, said switching means including a movable contact member, a second 2-phase induction motor having characteristics similar to that of the first motor operatively connected to said last mentioned means, operative to control the output voltage thereof applied to the first motor, means for applying a relatively fixed voltage to a one phase winding of said second motor, an electronic amplifier, the output circuit of which is operatively connected to the other phase winding of said second motor, means for applying an initial control voltage to the input of said amplifier, an alternating current voltage producing means operatively connected to and actuatable by said first motor, means for operatively connecting the voltage output of said voltage producing means to the input of said amplifier 180° out of phase with respect to said initial control voltage, means for limiting the maximum amplitude of the voltage from said means applied to the amplifier, and means operatively connecting said movable contact member and said amplifier to feed back a portion of the voltage applied thereby to said first motor into said amplifier, in electrical time phase with respect to the output voltage of said voltage producing means.

8. A motor control system including in combination a two-phase induction motor comprising a continuous speed-torque characteristic, said induction motor comprising a rotor of solid construction to provide the aforesaid speed-torque characteristic, a multitap transformer adapted to be coupled across a source of alternating current power, conductor means for coupling a fixed amplitude voltage from a source of alternating current power to one field winding of said two-phase motor, a selectively operable switching device for selectively connecting a desired tap point on said multitap transformer to the remaining field winding of said two-phase motor, the voltage coupled through said switching device to said last-mentioned field winding being in quadrature phase with respect to the fixed amplitude voltage coupled to said first-mentioned field winding, and control means for controlling the operation of said switching device.

9. A motor control system including in combination a two-phase induction motor comprising a continuous speed-torque characteristic, said induction motor comprising a rotor of solid construction to provide the aforesaid speed-torque characteristic, a multitap transformer adapted to be coupled across a source of alternating current power, conductor means for coupling a fixed amplitude voltage from a source of alternating current power to one field winding of said two-phase motor, a selectively operable switching device for selectively connecting a desired tap point on said multitap transformer to the remaining field winding of said two-phase motor, the voltage coupled through said switching device to said last-mentioned field winding being in quadrature phase with respect to the fixed amplitude voltage coupled to said first-mentioned field winding, control means for controlling the operation of said switching device, means for deriving an indication of the character of movement of said motor, and circuit means interconnecting said indication deriving means and said control means for maintaining said motor in a set condition of operation.

10. A motor control system including in combination a two-phase induction motor having a continuous speed-torque characteristic whereby the motor may be varied continuously from top speed in one direction through zero speed to top speed in the opposite direction, a multitap autotransformer adapted to be coupled across two terminals of a source of three-phase alternating current electric power, an intermediate point of said autotransformer being grounded, fixed connecting means for connecting one field winding of said two-phase motor between the grounded intermediate point of said autotransformer and the third terminal of the source of three-phase alternating current power, and a selectively operable switching device operatively connecting any desired tap point on said multitap transformer to the remaining field winding of said two-phase motor for applying a varying amplitude voltage thereto in quadrature-phase with respect to the voltage across said first-mentioned field winding.

11. The combination set forth in claim 10 wherein said two-phase motor has a rotor of solid construction to provide the desired speed-torque characteristic.

12. A motor control system including in combination a two-phase induction motor having a continuous speed-torque characteristic whereby the motor may be varied continuously from top speed in one direction through zero speed to top speed in the opposite direction, a multitap autotransformer adapted to be coupled across two terminals of a source of three-phase alternating current electric power, an intermediate point of said autotransformer being grounded, fixed connecting means for connecting one field winding of said two-phase motor between the grounded intermediate point of said autotransformer and the third terminal of the source of three-phase alternating current power, a selectively operable switching device operatively connecting any desired tap point on said multitap transformer to the remaining field winding of said two-phase motor for applying a varying amplitude voltage thereto in quadrature-phase with respect to the voltage across said first-mentioned field winding, control means for controlling the operation of said selective switching device, means connected to said two-phase for deriving an indication of the character of movement of said motor, and circuit means interconnecting said indication deriving means and said control means for maintaining said motor in a set condition of operation.

13. The combination set forth in claim 10 wherein said switching device comprises a mechanically operable switching mechanism having a movable switching arm and stationary contacts, the stationary contacts of said switching mechanism being connected to selected tap points of said multitap autotransformer, the combination being further characterized by a second electric motor having the shaft thereof mechanically connected to the movable switching arm of said switching device, and means for applying a controlling signal to a field winding of said second motor to control the position of the said movable switching arm in accordance with said controlling signal.

14. The combination set forth in claim 10 wherein said switching device comprises a mechanically operable switching mechanism having a movable switching arm and stationary contacts, the stationary contacts of said switching mechanism being connected to selected tap points on said multitap autotransformer, the combination being further characterized by a second electric motor having the shaft thereof mechanically connected to the movable switching arm of said switching device, means for applying a controlling signal to a field winding of said second motor to control the position of the said movable switching arm in accordance with said controlling signal, a voltage generator operatively connected to the shaft of said two-phase motor for deriving a voltage proportional to the speed of said two-phase motor, and circuit means interconnecting said generator and said control signal applying means for maintaining said two-phase motor at a set speed irrespective of the load applied thereto.

15. The combination set forth in claim 10 wherein said switching device comprises a mechanically operable switching mechanism having a movable switching arm and stationary contacts, the stationary contacts of said switching mechanism being connected to selected tap points on said multitap autotransformer, the combination being further characterized by a second electric motor having the shaft thereof mechanically connected to the movable switching arm of said switching device, means for applying a controlling signal to a field winding of said second motor to control the position of the said movable switching arm in accordance with said controlling signal, a Selsyn unit including transmitter and receiver elements, the transmitter element of said Selsyn unit having the rotor thereof mechanically coupled to a low power position control apparatus and the receiver element of said Selsyn unit having the rotor thereof mechanically coupled to the output shaft of said two-phase induction motor, said receiver element serving to derive an error signal indicative of the difference in position of said position control apparatus and the rotor of said two-phase motor, and means for coupling said error signal to said means for applying a controlling signal to a field winding of said second motor.

16. The combination set forth in claim 10 wherein said switching device comprises a mechanically operable switching mechanism having a movable switching arm and stationary contacts, the stationary contacts of said switching mechanism being connected to selected tap points on said multitap autotransformer, the combination being further characterized by a second electric motor having the shaft thereof mechanically connected to the movable switching arm of said switching device, means for applying a controlling signal to a field winding of said second motor to control the position of the said movable switching arm in accordance with said controlling signal, a Selsyn unit including transmitter and receiver elements, the transmitter of said Selsyn unit having the rotor thereof mechanically coupled to a low power position control apparatus and the receiver element of said Selsyn unit having the rotor thereof mechanically coupled to the output shaft of said two-phase induction motor, said receiver element serving to derive an error signal indicative of the difference in position of said position control apparatus and the rotor of said two-phase, a generator having the rotor thereof mechanically connected to the shaft of said two-phase induction motor and deriving a signal indicative of the speed of the shaft of said two-phase motor, and circuit means for connecting the output of said generator and the error signal derived by the receiver element of said Selsyn unit to said means for applying a controlling signal to a field winding of said second motor, said circuit means also including a limiter device for effecting damping of said switching arm as the same approaches an equilibrium position.

JOHN R. JARVIS.

References Cited in the file of this patent

UNITED STATES PATENTS

| Number | Name | Date |
|---|---|---|
| 1,233,292 | Hellmund | Aug. 28, 1917 |
| 1,399,832 | Wait | Dec. 13, 1921 |
| 1,562,917 | Richter | Nov. 24, 1925 |
| 2,239,768 | Artzt | Apr. 29, 1941 |
| 2,408,069 | Hull et al. | Sept. 24, 1946 |
| 2,414,430 | Nisbet | Jan. 14, 1947 |
| 2,453,451 | Moseley | Nov. 9, 1948 |
| 2,466,035 | McCoy | Apr. 5, 1949 |
| 2,471,422 | Frost | May 31, 1949 |
| 2,480,157 | Moseley et al. | Aug. 30, 1949 |
| 2,504,017 | George et al. | Apr. 11, 1950 |
| 2,510,467 | Fuge | June 6, 1950 |
| 2,598,221 | Burton | May 27, 1952 |